July 24, 1951 E. A. WEINBERG 2,562,157
GATE VALVE
Filed June 18, 1946 4 Sheets-Sheet 3

INVENTOR.
Edwin A. Weinberg
BY
ATTORNEY

July 24, 1951     E. A. WEINBERG     2,562,157
GATE VALVE

Filed June 18, 1946     4 Sheets-Sheet 4

INVENTOR
Edwin A. Weinberg
ATTORNEY

Patented July 24, 1951

2,562,157

UNITED STATES PATENT OFFICE 2,562,157

GATE VALVE

Edwin A. Weinberg, Troy, N. Y., assignor to The Ludlow Valve Manufacturing Co., Inc., Troy, N. Y., a corporation of New York Application June 18, 1946, Serial No. 677,592

2 Claims. (Cl. 251—71)

My invention relates to valves and particularly to improvements in double disc gate valves of the type in which the valve gate is guided during its opening and closing movements.

In gate valves of the double disc type which are not provided with gate guides the disc on the outlet side of the valve, during the opening and closing thereof, is forced against its seat by the pressure of the fluid passing through the valve. The gate and seat rings are thus subject to wear over the entire area thereof and, when the valve is left in partly open or throttling condition, the pressure is concentrated on those small areas of contact between the gate and seat rings where they cross each other and the wear in these zones is particularly excessive. As a result, in a short time, the valve cannot be tightly closed. Wash water valves used in water filtration plants which, in normal use, are subject to frequent operation and are often left for prolonged periods in partly open position are especially subject to wear in this way.

The fact that double disc gate valves are vulnerable in this respect is well known and various modifications in the design thereof have been proposed to eliminate this rapid wear. In the so-called square bottom valve, for example, the gate is provided with comparatively small shoes which are riveted or otherwise secured to wings on each side of the outlet disc which ride up and on to bronze guide tracks which are fastened to the valve body. These shoes and the guide tracks on which they run wear down in a short time and are not only difficult and expensive to replace but are costly to manufacture in the first instance.

In the so-called beamed waterway gate valve, increased bearing area for the disc on the outlet side of the valve is provided by two, vertically disposed beams which are positioned directly in the center of the port area. Bronze strips on the gate having their faces coplanar with the seat and disc rings bear against these beams and slightly increase the total contact area between the movable gate and the stationary parts with which it moves in contact, but the presence of the beams substantially reduces the cross-sectional area of the valve outlet and increases the turbulence and friction loss in the valve.

The principal object of this invention is to provide a simple, easily applied, readily replaceable and inexpensive mechanism for guiding the valve gates during their entire travel to prevent them from coming into contact with the valve seats until final closure is effected.

With these objects in view my invention includes the novel combination and arrangement of elements described below and illustrated in the accompanying drawings in which—

Figure 1:
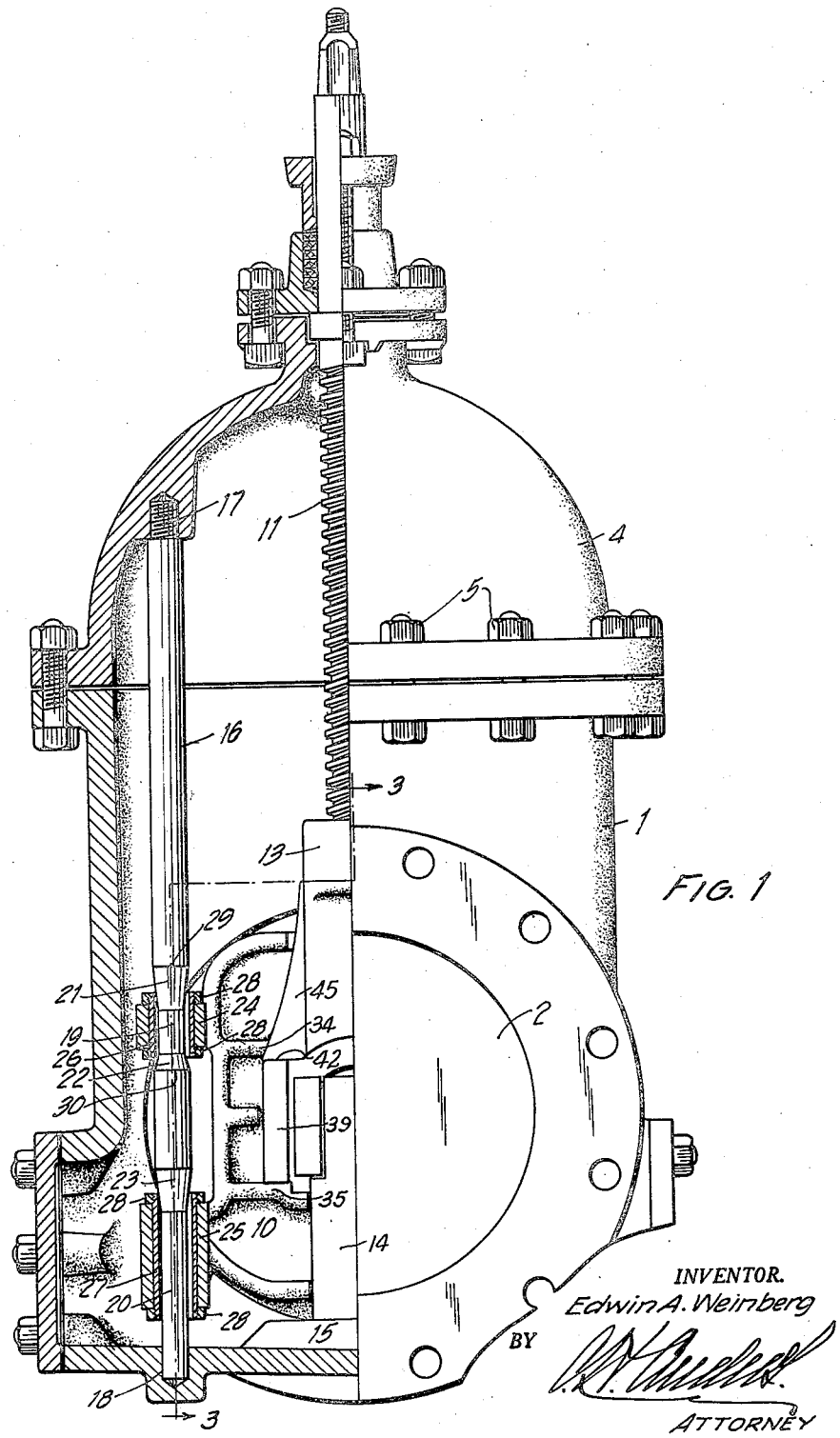
Fig. 1 is a fragmentary elevation view, half in section, through a valve embodying my invention looking in the direction in which the fluid flows through the valve and showing, in the section half, the back of the gate on the outlet side of the valve.
Figure 2:
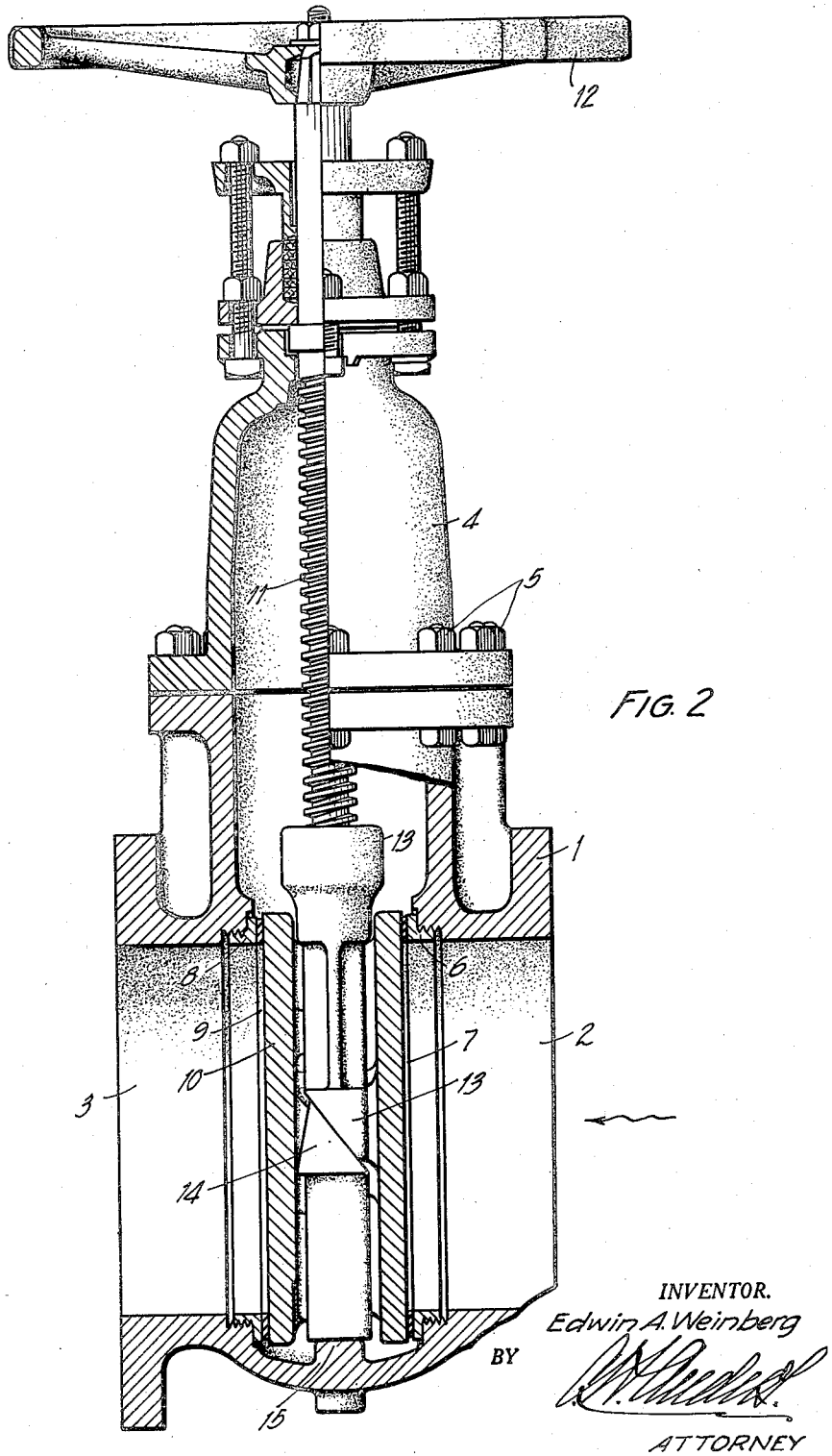
Fig. 2 is a fragmentary elevation view of my valve with portions broken away and portions in section.

As a group, Figs. 5, 6, 7 and 8 form an exploded perspective view of the gates and wedges.

Referring to the drawings—

My valve comprises a case or body 1 provided with a fluid inlet 2 and a fluid outlet 3. 4 is the cover or bonnet which is secured to a top flange on the case by means of the bolts 5. Surrounding the fluid inlet on the inside of the case is a seat ring 6 against which the gate ring 7 is seated when the valve is closed, and surrounding the outlet of the valve on the inside of the case is a seat ring 8 which cooperates with a ring 9 on the gate 10. The valve is provided with the usual threaded stem 11, which works through a bronze nut 33 (see Fig. 7) in the upper wedge 13, and which may be turned by the hand wheel 12 to raise and lower the gates.

Figure 7:
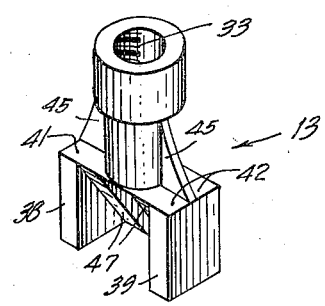
Fig. 7 is a perspective view of the upper wedge which cooperates with the stem to raise and lower the gates.
Figure 5:
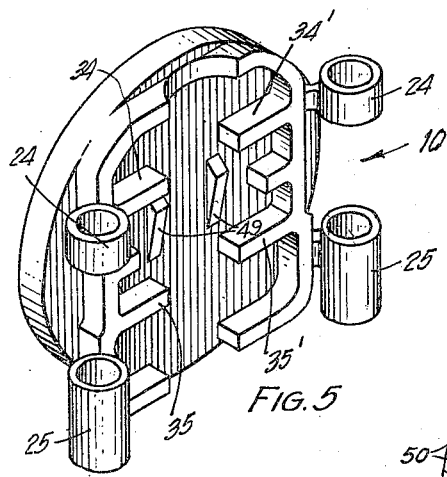
Fig. 5 is a perspective view of the outlet gate.
Figure 6:
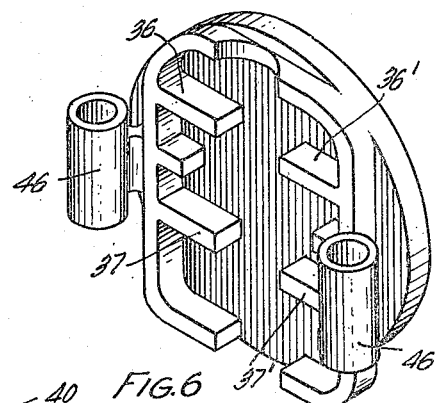
Fig. 6 is a perspective view of the inlet gate.
Figure 8:
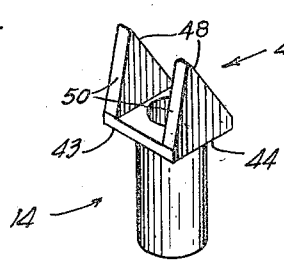
Fig. 8 is a perspective view of the lower wedge.

Referring to Figs. 5 to 7, inclusive, it will be noted that the gates, on their opposed faces, are each provided with vertically-spaced, horizontally-extending ribs, 34, 34' and 35, 35' on the outlet gate, and 36, 36' and 37, 37' on the inlet gate. In assembled relation, the depending portions 38 and 39 on the upper wedge 13 are received between these vertically spaced ribs, and the upper portion 40 of the lower wedge is received between said depending portions 38 and 39. Thus, when the upper wedge is raised by turning the stem 11, the shoulders 41 and 42 thereon, which underlie said upper ribs on the gates, function to carry the gates upwardly; and the lower of said ribs on the gates, which underlie the shoulders 43 and 44 on the lower wedge 14, function to carry the lower wedge upwardly. The ribs or flanges 45 on the sides of the upper wedge lie between the gates.

In opening the valve the first turn of the stem releases the upper wedge from its wedging contact with the lower wedge 14 which releases the disc closing the inlet passage so that fluid under pressure entering the case forces it laterally away from its seat. While the disc which closes the outlet passage is also released and may move laterally away from its seat, insofar as the wedges are concerned, it is, nevertheless, held forcibly against its seat by the fluid pressure which develops in the case. If no means were provided for positively moving the downstream disc laterally away from its seat as the valve is opened and closed it would remain in frictional contact therewith as the gate is raised and lowered and the contacting surfaces would be subjected to rapid wear.

The distance from top to bottom of portions 38 and 39 of the upper wedge is slightly less than the distance between the upper and lower ribs on the discs, and, in closing, the discs ride downwardly parallel to their seats simply suspended from the upper wedge by means of the upper ribs on said discs which rest on the shoulders 41 and 42 of said wedge. The lower wedge rides downwardly suspended from the lower ribs on the discs by means of the shoulders 43 and 44 which rest thereon. During this downward movement, the wedging surfaces 47 on the upper wedge, which are designed to cooperate with the wedging surfaces 48 on the lower wedge, are out of wedging cooperation therewith. The downward movement of the gate-wedge assembly proceeds until the bottom of the lower wedge 14 strikes the boss 15 in the bottom of the case, whereupon the lower wedge stops. However, the upper wedge and the discs continue to move downwardly bringing the wedging surfaces 47 into contact with the surfaces 48 on the lower wedge, and the wedging surfaces 49 on disc 10 into contact with the wedging surfaces 50 on the lower wedge. Thereafter, the discs are forced downwardly, by the upper wedge, as it moves downwardly, by contact of the bottoms of the depending portions 38 and 39 with the lower ribs 35, 35', 37 and 37' on the discs. The depending portions 38 and 39 of the upper wedge are in contact with the inner face of the disc shown in Fig. 6, and the wedging cooperation of the surfaces 47 with the surfaces 48, and the surfaces 49 with the surfaces 50 forces the discs apart and into contact with their respective seats. Since the bottoms of the depending portions 38 and 39 on the upper wedge are merely in contact with the ribs 35, 35' and 36, 36', the discs are free to move laterally into valve closed position.

Figure 3:
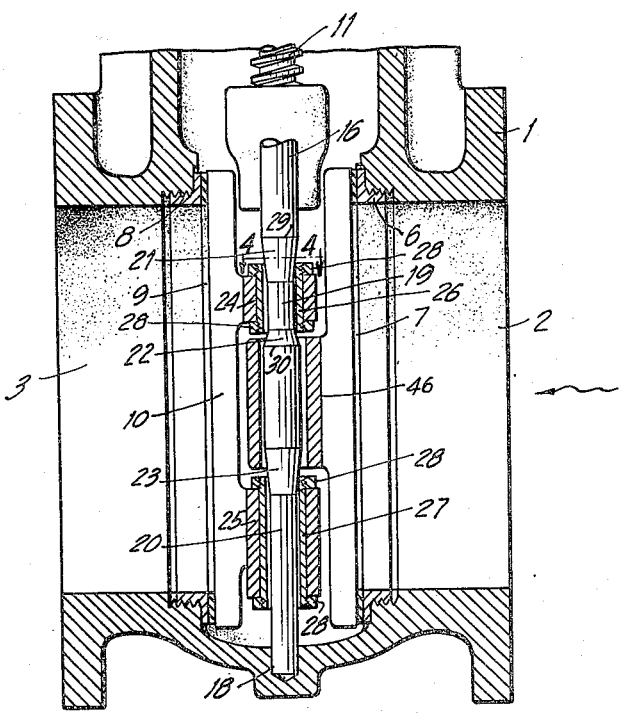
Fig. 3 is a fragmentary sectional view of Fig. 1 in the plane 3—3 showing the guide rod bearings in section.

In order to provide a means for positively moving the downstream disc out of contact with its seat as the valve is opened and so maintaining it while said valve is opened, I provide two guide bars 16 within the casing, one on each side of the gate, which are disposed parallel to the stem 11. As illustrated in Figs. 1 and 3, these bars, at the top thereof, are threaded into the cover or bonnet as shown at 17 in Fig. 1 and, at the bottom, are received in recesses 18 in the bottom of the body. To facilitate manufacture, the guide bars 16 are preferably turned from round stock and are provided with portions 19 and 20 of reduced cross-sectional area. Frusto-conical transition surfaces 21, 22 and 23, forming ramps join those portions of the bar 16 of minimum cross-sectional area with those portions of the bars which are of the normal maximum cross-sectional area.

Figure 4:
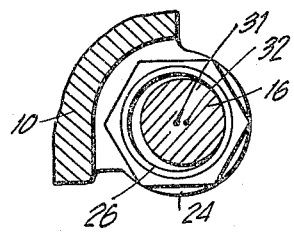
Fig. 4 is an enlarged fragmentary sectional view of Fig. 3 in the plane 4—4.

Preferably cast integral with the disc 10, which closes the outlet passage of the valve, and at each side thereof, is a pair of sleeve bearings, 24 at the top and 25 at the bottom. These bearings are provided, respectively, with replaceable bronze bushings 26 and 27 which have a fairly close running fit on those portions of the guide bars 16 which are of maximum diameter. As illustrated, the bushings are secured in the sleeve bearings by means of nuts 28 at each end, but it is to be understood they may be press fitted or otherwise secured therein. Since the bushings have a fairly close sliding fit on those portions of the guide bars which are of maximum diameter, it will be apparent that when the bushings are disposed in the ramp zones of the bars 16 or in the zones of minimum cross-sectional area some freedom of lateral movement of the disc 10 with respect to the guide bars is provided. The axes of the guide bars are disposed in a plane parallel to the plane of the seat of the disc 10 and the distance between these planes is slightly greater than the distance between the plane defined by the axes of the bushings and the plane of the face of the gate ring 9 on the disc 10. Thus, when the bushings 26 and 27 are coaxial with the guide bars 16, the plane of the face of the gate ring is parallel to and spaced from the plane of the face of its seat. However, the ramp surfaces 21, 22 and 23, respectively, allow the axes 31 of the bushings to dispose themselves or to be disposed eccentric to the axes 32 of the guide bars 16, as shown in Fig. 4, to a degree sufficient to allow the gate ring on the disc 10 to move or to be moved laterally into passage-closing contact with its seat.

From the foregoing it will be apparent that, when the gate is raised from the closed position shown in the drawing, the bushings 26 and 27 will ride upwardly on the ramps 21 and 23 respectively, and thus positively move the disc 10 laterally away from its seat and will so maintain it while the valve is open.

It will be noted from Figs. 1 and 3, that the sleeve bearings 25 at the bottom of the disc are substantially longer than the sleeve bearings 24 at the top of the disc, and that the length of the sleeve bearings 25, including their bushings, are somewhat greater than the distance between the high points 29 and 30, respectively, of the ramp surfaces 21 and 22. Thus, the sleeve bearings 25 in passing over the portions 19 of reduced cross-sectional area of the bar 16 and their associated ramps will always be in contact with portions of the bar 16 of maximum diameter, and thus the disc 10, after it starts its opening movement will always be maintained parallel to and spaced from its seat.

My making the guide bars 16 circular in cross section they may be cheaply manufactured by merely turning down the ramps and portions of reduced cross-sectional area thereof in a lathe. They are preferably formed of a stainless steel to reduce the corrosion thereof and, in the event of wear, may be readily removed for replacement merely by removing the bonnet 4 and unscrewing them. Similarly, if the bushings 26 and 27 become worn, new bushings may be readily inserted.

Since the inlet gate is subjected to water pressure tending to force it away from its seat, the bearings 46 thereon fit loosely on the bars 16.

What I claim is:

1. A valve of the double disc gate type comprising a body provided with a fluid inlet and a fluid outlet passage, a separate gate disc for closing each of said passages, a seat for each of said discs, means, including a stem and nut cooperating with said discs for sliding said discs towards and away from said seats to close and open said valve, bars in said body disposed approximately parallel to said stem and positioned at the sides of said discs; bearings on at least one of said discs slidably cooperating with said bars and positively holding said disc in laterally-spaced relation to its seat substantially throughout the valve opening and closing sliding movements thereof; but said bars having portions of reduced cross-sectional area positioned to cooperate with said bearings when said disc is substantially in axial alignment with its seat to provide for lateral movement of said disc relative to said bars and into valve-closing contact with its seat; said portions of said bars of reduced cross-sectional area being connected to the other portions of said bars by transition surfaces cooperating with said bearings substantially at the beginning of the valve-opening sliding movement of said disc to move said disc laterally away from its seat; and wedges actuated by said stem and cooperating with said gate discs for moving said discs laterally towards and into contact with their respective seats when in axial alignment therewith to close said valve.

2. A valve of the double disc gate type comprising a body provided with a fluid inlet and a fluid outlet passage, a separate gate disc for closing each of said passages, a seat for each of said discs, means, including a stem and nut cooperating with said discs for sliding said discs towards and away from said seats to close and open said valve, a round guide bar in said body disposed substantially parallel to said stem and adjacent said discs at each side thereof; sleeve bearings on each side of at least one of said discs slidably fitted on said bars and positively holding said discs in laterally-spaced relation to its seat substantially throughout the valve-opening and closing sliding movements thereof; but said bars having portions of reduced cross-sectional area thereon positioned to lie within said bearings when said disc is substantially in axial alignment with its seat to provide for lateral movement of said disc relative to said bars and into valve-closing contact with its seat; said portions of said bars of reduced cross-sectional area being connected to the other portions of said bars by frusto-conical surfaced portions forming ramps cooperating with said bearings to move said disc laterally away from its seat as it is moved upwardly at the beginning of the valve-opening movement thereof; and wedges actuated by said stem and cooperating with said gate discs for moving said discs laterally towards and into contact with their respective seats when in axial alignment therewith to close said valve.

EDWIN A. WEINBERG.

REFERENCES CITED

The following references are of record in the file of this patent:

UNITED STATES PATENTS

| Number | Name | Date |
|---|---|---|
| 1,844,246 | Fox | Feb. 9, 1932 |
| 2,287,435 | Koon | June 23, 1942 |

FOREIGN PATENTS

| Number | Country | Date |
|---|---|---|
| 21,939 | Great Britain | Oct. 5, 1911 |